May 13, 1952 C. A. BAYES 2,596,197
WINDSCREEN WIPER
Filed Dec. 31, 1947
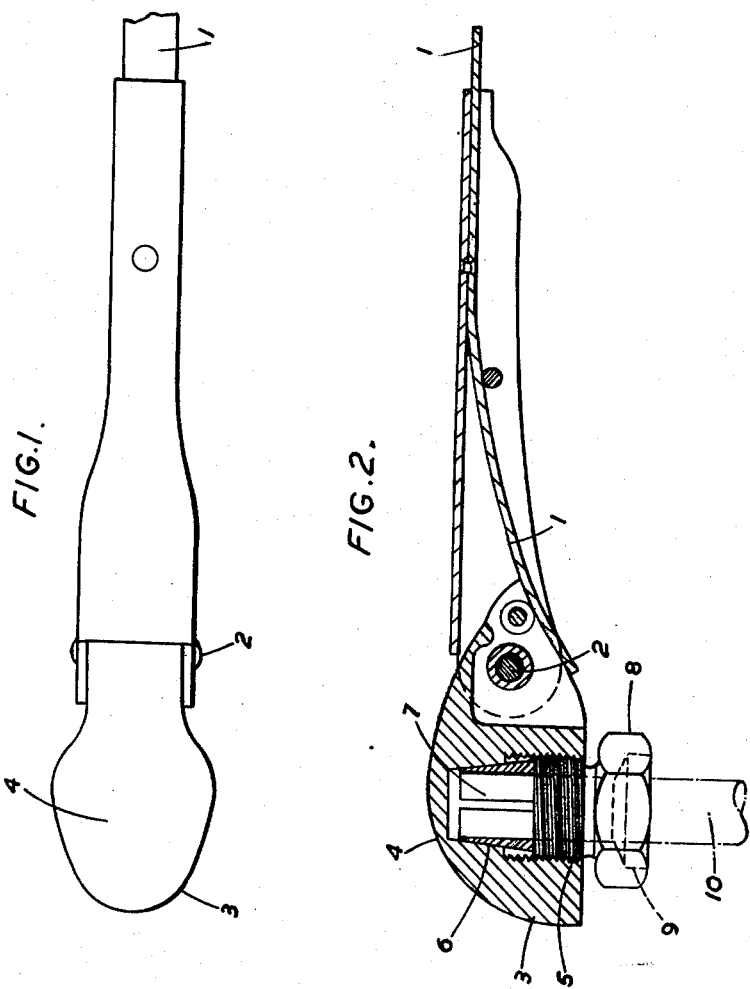
Inventor
Charles Arthur Bayes
By
Beau, Brooks, Buckby & Beau.
Attorneys Patented May 13, 1952

2,596,197

UNITED STATES PATENT OFFICE 2,596,197

WINDSCREEN WIPER

Charles Arthur Bayes, Pettswood, England, assignor to Trico Products Corporation, Buffalo, N. Y., a corporation of New York Application December 31, 1947, Serial No. 795,096
In Great Britain July 8, 1946

Section 1, Public Law 690, August 8, 1946
Patent expires July 8, 1966

5 Claims. (Cl. 287—53)

This invention relates to windscreen wipers in which an arm which carries the wiper blade is mounted upon an oscillatable spindle, and the invention is concerned more particularly with the means by which the arm is mounted upon the spindle.

The mounting means with which the invention is in particular concerned is of the kind which comprises a metal collar which engages over the end of the spindle and is pressed into contact therewith by means of a nut which screws into a mounting socket with which the blade-carrying arm is provided.

In one such form of mounting, the collar, which is split longitudinally, has an outer tapered or conical surface engaging a complementary surface on the inside of the mounting socket and is axially displaced when the nut is screwed into the mounting socket and thereby contracted on to the spindle. Alternatively, the collar abuts against a wall or step in the mounting member and the nut has an internal tapered or conical recess which coacts with the outer tapered or conical surface of the collar. In either of the above-mentioned forms of construction also the end of the spindle may be tapered, the part of greatest diameter being on the outside. In another form, one end of the collar is closed and encloses the end of the spindle, and is fitted with a screw which, when turned, bears against the end of the spindle and displaces the collar from the spindle.

In the above-mentioned forms of construction the collar may be in some cases made in two or more parts.

In the forms of mounting described, the mounting socket has an axial bore which passes right through the socket, and the spindle is inserted from the inner end while the nut is screwed into the socket from the outer end, and, even when screwed home, projects to a considerable extent, which has the disadvantage of detracting from the appearance of the wiper arm.

Now the object of the invention is to provide an improved form of mounting which obviates the aforesaid disadvantage, and enables the front of the arm as fixed to the vehicle to present a plain streamlined appearance.

According to the invention, the above-mentioned mounting means and the forms of construction thereof which have been described are reversed, in that a hole is bored through the nut, which is then screwed into the underside of the mounting socket, and the end of the spindle is introduced into the mounting socket through the hole in the nut. The outer end of the mounting socket which is unbroken may be given any desired form, so as to present for example, a streamlined effect.

The nut is preferably provided, on the side remote from the mounting socket with a counterbore which, when the nut is unscrewed, bears against the housing of the spindle and so pushes the arm off the spindle. This overlap where the recess comes into contact with the housing of the spindle also prevents the ingress of rain water.

In order that the invention may be easily understood and readily carried into effect, a windscreen wiper arm having mounting means in accordance with the invention is illustrated, by way of example, in the accompanying drawing, in which:

Figure 1 is a plan view of the wiper arm, and

Figure 2 is a side elevation, partly in section through the mounting socket.

Referring to the drawing, the wiper arm 1, which may be of any known construction, is pivotally connected by a pivot 2 to a mounting socket 3. The mounting socket 3 has an unbroken outer surface 4 which is shaped to form a continuation of the outer surface of the arm 1. In its underside the mounting socket is provided with an internal bore, the outer end portion 5 of which is screw-threaded to receive a nut 8 and the inner end 6 of which is tapered or conical. In the conical part 6 is fitted a split metal collar 7 having a complementary tapered surface which coacts with the tapered surface of the bore.

In order to fix the arm 1 on the actuating oscillating spindle 10, which latter may be tapered, the spindle is passed through the bore of the nut into the collar 7 and the nut is tightened whereby the collar is axially displaced and caused to contract on to the spindle.

The outer end of the nut 8 may be provided with a counterbore 9 forming a recess about the opening through the nut, which recess, when the nut is unscrewed, provides a depressed surface about the actuating spindle or shaft for receiving as an abutment the spindle supporting portion of the windshield cleaner motor for reacting in pushing the arm off the spindle.

The invention is obviously applicable also to the other modified forms of construction previously mentioned.

I claim:

1. A windshield wiper carrying arm having a mounting socket formed with a spindle-receiving bore in its underface while maintaining the upper face unbroken, the bore of the mounting socket having a screw-threaded portion adjacent its open end, a collar of rigid material disposed in said bore adjacent the closed end and a nut having an axial aperture for the passage of said spindle, said nut being adapted to screw into said screw-threaded portion of said bore.

2. A windshield wiper carrying arm having a mounting socket formed with a spindle-receiving bore in its underface while maintaining the upper face unbroken, the bore of the mounting socket having a conical portion adjacent said closed end and a screw-threaded portion adjacent its open end, a conical collar of rigid material disposed in said conical portion of said bore for surrounding said spindle and a nut having an axial aperture for the passage of said spindle, said nut being adapted to screw into said threaded portion of said bore so as to press said collar into engagement with said mounting socket and with said spindle.

3. A windshield wiper carrying arm having a mounting socket formed with a spindle-receiving bore in its underface while maintaining the upper face unbroken, the bore of the mounting socket having a conical portion adjacent said closed end and a screw-threaded portion adjacent its open end, an axially split conical collar of rigid material disposed in said conical portion of said bore for surrounding said spindle and a nut having an axial aperture for the passage of said spindle, said nut being adapted to screw into said threaded portion of said bore so as to press said collar into engagement with said mounting socket and with said spindle.

4. A windshield wiper carrying arm having a mounting socket formed with a spindle-receiving bore in its underface while maintaining the upper face unbroken, the bore of the mounting socket having a screw-threaded portion adjacent the open end, a collar disposed in said bore adjacent its closed end and a nut having an axial aperture for the passage of said spindle, said nut being adapted to screw into said screw-threaded portion of said bore and having a recess in its outer surface of greater diameter than said axial aperture for receiving an abutment upon unscrewing from the arm to set up an arm-displacing reaction.

5. A windshield wiper carrying arm having a mounting socket formed with a spindle-receiving bore in its underface while having the upper face unbroken, an actuating spindle in the bore, a collar disposed in said bore for surrounding said spindle in the bore, and means wholly on the underside of said socket for pressing said collar into engagement with said mounting socket and with said spindle, said pressing means having threaded engagement with the bore for being screwed thereinto to effect such collar engagement, said pressing means having an outer face engageable when being unscrewed with a spindle-supporting abutment to set up a reacting force to effect opposite relative movement between the mounting socket and the collar to enable the arm being removed from the spindle.

CHARLES ARTHUR BAYES.

REFERENCES CITED

The following references are of record in the file of this patent:

UNITED STATES PATENTS

| Number | Name | Date |
| --- | --- | --- |
| 1,267,959 | Beeker | May 28, 1918 |
| 1,655,734 | McWilliams | Jan. 10, 1928 |
| 2,041,385 | Van Laanen | May 19, 1936 |
| 2,064,440 | Meeker | Dec. 15, 1936 |
| 2,286,035 | Horton et al. | June 9, 1942 |
| 2,326,402 | Smulski | Aug. 10, 1943 |
| 2,447,299 | Williams | Aug. 17, 1948 |